United States Patent
Berry (10) Patent No.: US 12,555,455 B2
(45) Date of Patent: Feb. 17, 2026

(54) SYSTEM AND METHOD FOR USING A WEARABLE LOCATION TRACKING AND MONITORING DEVICE

(71) Applicant: Judy Berry, Metter, GA (US)

(72) Inventor: Judy Berry, Metter, GA (US)

(*) Notice: Subject to any disclaimer, the term of this patent is extended or adjusted under 35 U.S.C. 154(b) by 63 days.

(21) Appl. No.: 18/411,904

(22) Filed: Jan. 12, 2024

(65) Prior Publication Data
US 2024/0242588 A1     Jul. 18, 2024

Related U.S. Application Data

(60) Provisional application No. 63/438,688, filed on Jan. 12, 2023.

(51) Int. Cl.
*G08B 21/02*     (2006.01)
*G08B 21/18*     (2006.01)

(52) U.S. Cl.
CPC .................. *G08B 21/18* (2013.01)

(58) Field of Classification Search
CPC .......... G06F 1/163; G06F 3/011; G06F 3/013; G06F 3/017; G06F 3/167; G06F 3/012; G06F 3/0346; G06F 3/016; G06F 21/32; G06F 1/1686; G06F 1/1694; G06F 3/04815; G06F 3/04842; G06F 3/165; G06F 1/3231; G06F 1/3265; G06F 2203/04803; G06F 2203/04806; G06F 3/0231; G06F 3/03545; G06F 3/0482; G06F 3/04845; G06F 3/0485; G06F 3/0486; G06F 3/1423; G06F 3/1454; G06F 40/169; G06F 3/014; G06F 2203/013; G06F 2203/0331; G06F 2203/0382; G06F 2203/0383; G06F 2203/0384; G06F 3/0325; G06F 3/038; G06F 3/0383; G06F 3/0487; G06F 1/1626; G06F 1/203; G06F 1/1637; G06F 1/1643; G06F 1/165; G06F 1/1652; G06F 1/1654; G06F 1/1684; G06F 1/169; G06F 1/1692; G06F 15/0216; G06F 18/22; G06F 3/03547; G06F 3/0393; G06F 3/0421;
(Continued)

(56) References Cited

U.S. PATENT DOCUMENTS

7,298,258 B1 * 11/2007 Hudgens ................ F16P 3/147
                                                                340/3.1
7,511,627 B2   3/2009 Holoyda
(Continued)

*Primary Examiner* — Daniel Previl
(74) *Attorney, Agent, or Firm* — Boudwin Intellectual Property Law, LLC; Daniel Boudwin (57) ABSTRACT

A system and method for using a wearable location tracking and monitoring device that provides users with a wearable location tracking and monitoring device to notify a guardian, a caretaker, or a security person whenever the user of the bracelet is off from their particular routine or if the bracelet is being tampered with. The system includes a video camera having a lens element that is positioned beneath a transparent shroud element that resembles a jewel, such that the lens element is hidden from plain view. The system also includes a locking closure window disposed over an electronic locking closure to view a pair of extensions that are inserted into a corresponding pair of apertures that are pushed together to lock the tracking bracelet. The overall system includes a method of use and a non-transitory computer storage media to execute the overall method.

18 Claims, 7 Drawing Sheets

(58) Field of Classification Search
CPC ............... G06F 1/1656; G06F 16/2379; G06F 2203/0336; G06F 3/015; G06F 3/021; G06F 3/03543; G06F 3/0362; G06F 3/0395; G06F 3/048; G06F 1/105; G06F 16/2228; G06F 16/2358; G06F 16/288; G06F 16/9024; G06F 2221/2111; G06F 3/02; G06F 9/547; G06F 17/00; G06F 21/00; G06F 21/35; G06F 2221/2101; G06F 3/0304; G06F 3/0484; G06F 3/0488; G06F 1/1635; G06F 18/23; G06F 1/3209; G06F 1/3246; G06F 11/3438; G06F 16/245; G06F 16/29; G06F 16/9566; G06F 18/00; G06F 18/214; G06F 18/2413; G06F 18/24147; G06F 18/2415; G06F 21/36; G06F 21/40; G06F 21/6245; G06F 2201/835; G06F 2209/509; G06F 2218/10; G06F 3/0418; G06F 3/0426; G06F 3/0481; G06F 3/14; G06F 30/13; G06F 9/4843; G06F 9/5027; G06F 9/542; G06F 1/1658; G06F 1/1675; G06F 1/188; G06F 16/70; G06F 18/24143; G06F 3/005; G06F 3/0338; G06F 3/044; G06F 3/147; G06F 40/40; G16H 40/67; G16H 10/60; G16H 40/63; G16H 50/20; G16H 50/30; G16H 10/20; G16H 40/20; G16H 10/65; G16H 20/30; G16H 50/80; G16H 50/70; G16H 20/40; G16H 30/20; G16H 40/40; G16H 50/50; G16H 70/20; G16H 80/00; G16H 20/10; G16H 20/70; G16H 15/00; G16H 20/60; G16H 10/40; G16H 40/60; G16H 20/13; G16H 70/00; G16H 50/00; G16H 40/00; G16H 30/00; G16H 20/00; G16H 10/00; G09G 2354/00; G09G 3/001; G09G 2320/0613; G09G 2320/064; G09G 2320/0686; G09G 2330/021; G09G 3/002; G09G 2320/0606; G09G 2340/045; G09G 2340/0464; G09G 2340/0492; G09G 2360/144; G09G 3/003; G09G 3/342; G09G 3/346; A44C 5/0015; A44C 9/0053; A44C 9/02; A44C 5/14; A44C 5/2042; A44C 17/025; A44C 5/145; A44C 5/2085; A44C 7/00; A44C 7/003; A44C 15/0015; A44C 5/0007; G09B 23/28; G09B 19/0038; G09B 19/00; G09B 19/0092; G09B 5/00; G01L 5/00; H04Q 9/00; H04Q 2209/40; H04Q 2209/43; H04Q 2209/47; H04Q 2209/75; H04Q 2209/86; H04Q 2209/88; G06N 3/02; G06N 3/09; G06N 3/042; G06N 3/044; G06N 3/0442; G06N 7/01; G06N 20/00; G06N 3/08; G06N 3/006; G06N 3/0455; G06N 3/048; G06N 20/10; G06N 3/0464; G06N 5/01; G06N 3/00; G06N 7/00; G06N 10/00; G06N 5/00; G06N 99/00; Y04S 40/18; Y04S 40/20; Y04S 10/00; Y04S 20/00; Y04S 30/00; Y04S 40/00; Y04S 50/00

USPC ........... 340/539.13, 3.1, 573.4, 568.1–572.9, 340/539.11, 539.15, 8.1, 686.1, 850, 340/853.1, 870.01, 901, 906, 907, 932.2, 340/933, 944, 945, 984, 988, 425.5, 340/146.2, 500, 1.1, 286.01, 425.1, 407.1, 340/815.4, 99, 384.1, FOR. 000, 340/FOR. 311, FOR. 415, FOR. 465

See application file for complete search history.

(56) References Cited

U.S. PATENT DOCUMENTS

| | | | |
|---|---|---|---|
| 8,698,623 B1 | 4/2014 | Hicks | |
| 9,747,770 B1 * | 8/2017 | Bartlett | ................ G08B 25/016 |
| 10,096,225 B2 * | 10/2018 | Thomas | ................ G07C 9/257 |
| 10,332,375 B1 * | 6/2019 | Gonzalez | ........... G08B 21/0252 |
| 11,170,282 B1 * | 11/2021 | Mohammad | ........... G06F 1/1658 |
| 11,250,682 B1 * | 2/2022 | Crawford | ........... G08B 21/0288 |
| 2013/0285794 A1 * | 10/2013 | Hansen | .............. H04N 1/00185 |
| | | | 340/8.1 |
| 2015/0109126 A1 | 4/2015 | Crawford | |

* cited by examiner

SYSTEM AND METHOD FOR USING A WEARABLE LOCATION TRACKING AND MONITORING DEVICE

CROSS-REFERENCE TO RELATED APPLICATIONS

This U.S. Non-Provisional Patent Application claims the benefit of U.S. Provisional Patent Application No. 63/438,688 filed on Jan. 12, 2023. The above identified patent application is herein incorporated by reference in its entirety to provide continuity of disclosure.

BACKGROUND OF THE INVENTION

The present invention relates to a system and method for using a tracking and monitoring device. More specifically, the present invention provides a system and method for using a wearable location tracking and monitoring device.

Some individuals such as the elderly or children may require monitoring and assistance. It may be important to determine the geographical location of these and other individuals. For example, some elderly individuals with cognitive disabilities may become lost and a guardian or caretaker may have no way of locating them. Furthermore, children who are lost or kidnapped may not easily be located and rescued without some additional electronic location assistance. In view of the above concerns, it is desirable to provide a wearable location tracking and monitoring device that may track and transmit the location of a wearer for safety.

Devices have been disclosed in the known prior art that are related to wearable Global Positioning Satellite or GPS tracking devices. These include devices that have been patented and that have been disclosed in published patent applications. However, these devices and systems have known drawbacks. For example, these location monitoring devices often lack a safe means for locking the device to the wrist so that it may not be accidentally removed. Further, the location monitoring systems in the known prior art lack a camera that is hidden from view for safety reasons.

What is needed is a system and method for using a wearable location tracking and monitoring device that provides users with a wearable location tracking and monitoring device to notifying a guardian, a caretaker, or a security person whenever the user of the bracelet is off from their particular routine or if it is being tampered with.

In light of the systems and methods for using a wearable location tracking and monitoring device disclosed in the known prior art, it is submitted that the present invention substantially diverges in design elements from the known prior art and consequently it is clear that there is a need in the prior art for an improvement to a system and method for using a wearable location tracking and monitoring device. In this regard the present invention substantially fulfills these needs.

SUMMARY OF THE INVENTION

In view of the foregoing disadvantages inherent in the known types of systems and methods for using a wearable location tracking and monitoring device now present in the prior art, the present invention provides a system and method for using a wearable location tracking and monitoring device, wherein the same may be utilized for providing convenience for a user when using a system and method for using a wearable location tracking and monitoring device.

The present system comprises a system for using a wearable location tracking and monitoring device that includes a server system with a processor system, a communications interface, a communications system, an input system and an output system, the server system having access to a communications network, a memory system with an operating system, a communications module, a web browser module, a web server application, and a non-transitory storage media for using a wearable location tracking and monitoring device, the memory system is in communication with the server system through the communications network, and a wearable remote monitoring device wirelessly communicates with a remote control device, wherein the wearable location tracking and monitoring device is in communication with the non-transitory storage media for using a wearable location tracking and monitoring device.

The present system also includes a corresponding method for using a wearable location tracking and monitoring device that includes the steps of obtaining a wearable location tracking and monitoring device, wearing the wearable location tracking and monitoring device, notifying a wearer about breeching the wearable location tracking and monitoring device, and resetting the wearable location tracking and monitoring device.

The present system also includes a corresponding non-transitory computer storage media that executes the corresponding method for using a wearable location tracking and monitoring device that includes the steps of obtaining a wearable location tracking and monitoring device, wearing the wearable location tracking and monitoring device, notifying a wearer about breeching the wearable location tracking and monitoring device, and resetting the wearable location tracking and monitoring device.

It is an object of the present invention to provide a system and method for using a wearable location tracking and monitoring device that provides users with a wearable location tracking and monitoring device to notifying a guardian, a caretaker, or a security person whenever the user of the bracelet is off from their particular routine or if the bracelet is being tampered with.

It is an object of the present invention to provide a system and method for using a tracking and monitoring device that allows different parties to checkup on the device's status to help ensure the safety of the wearer of the device.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Reference is made herein to the attached drawings. Like reference numerals are used throughout the drawings to depict like or similar elements of a system and method for using a wearable location tracking and monitoring device. The figures are intended for representative purposes only and should not be considered to be limiting in any respect.

Figure 1:
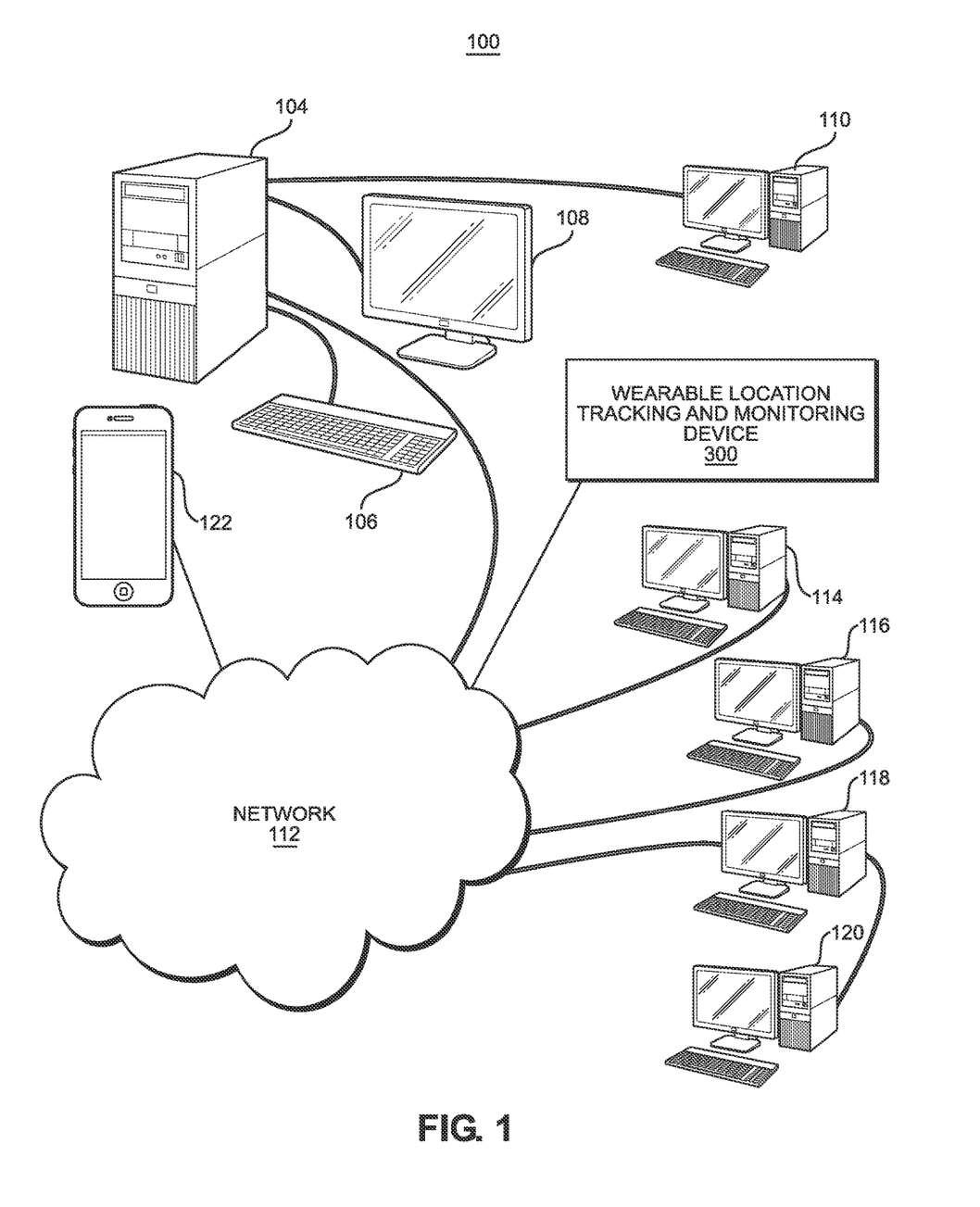
FIG. 1 shows a system overview of a system for using a wearable location tracking and monitoring device.

Referring now to FIG. 1, there is shown a system overview of a system for using a wearable location tracking and monitoring device 100.

The overall system 100 may include a server system 104, an input system 106, an output system 108, a plurality of client systems 110, 114, 116, 118 and 120, a communications network 112, a hand-held device 122, and a wearable location tracking and monitoring device 300. In other embodiments, the overall system 100 may include additional components and/or may not include all of the components listed above.

The server system 104 may include one or more servers. One server system 104 may be the property of the distributor of any related software or non-transitory storage media. In other embodiments, the overall system 100 may include additional components and/or may not include all of the components listed above.

The input system 106 may be used for entering input into the server system 104, and may include any one of, some of, any combination of, or all of a keyboard system, a mouse system, a track ball system, a track pad system, a plurality of buttons on a handheld system, a scanner system, a wireless receiver, a microphone system, a connection to a sound system, and/or a connection and/or an interface system to a computer system, an intranet, and/or the Internet (i.e., IrDA, USB), for example.

The output system 108 may be used for receiving output from the server system 104, and may include any one of, some of, any combination of or all of a monitor system, a wireless transmitter, a handheld display system, a printer system, a speaker system, a connection or an interface system to a sound system, an interface system to one or more peripheral devices and/or a connection and/or an interface system to a computer system, an intranet, and/or the Internet, for example.

The overall system 100 illustrates some of the variations of the manners of connecting to the server system 104, which may be an information providing website (not shown). The server system 104 may be directly connected and/or wirelessly connected to the client systems 110, 114, 116, 118, and 120 and are connected via the communications network 112. Client systems 120 may be connected to the server system 104 via the client system 118. The communications network 112 may be any one of, or any combination of, one or more local area networks or LANs, wide area networks or WANs, wireless networks, telephone networks, the Internet and/or other networks. The communications network 112 may include one or more wireless portals (not shown). The client systems 110, 114, 116, 118, and 120 are any system that an end user may use to access the server system 104. For example, the client systems 110, 114, 116, 118, and 120 may be personal computers, workstations, laptop computers, game consoles, handheld network enabled audio/video players, and/or any other network appliance.

The client system 120 may access the server system 104 via the combination of the communications network 112 and another system, which in this example is the client system 118. The client system 120 is an example of a handheld wireless device 122, such as a mobile phone or a handheld network enabled audio/music player or the like, which may also be used for accessing network content.

Figure 3A:
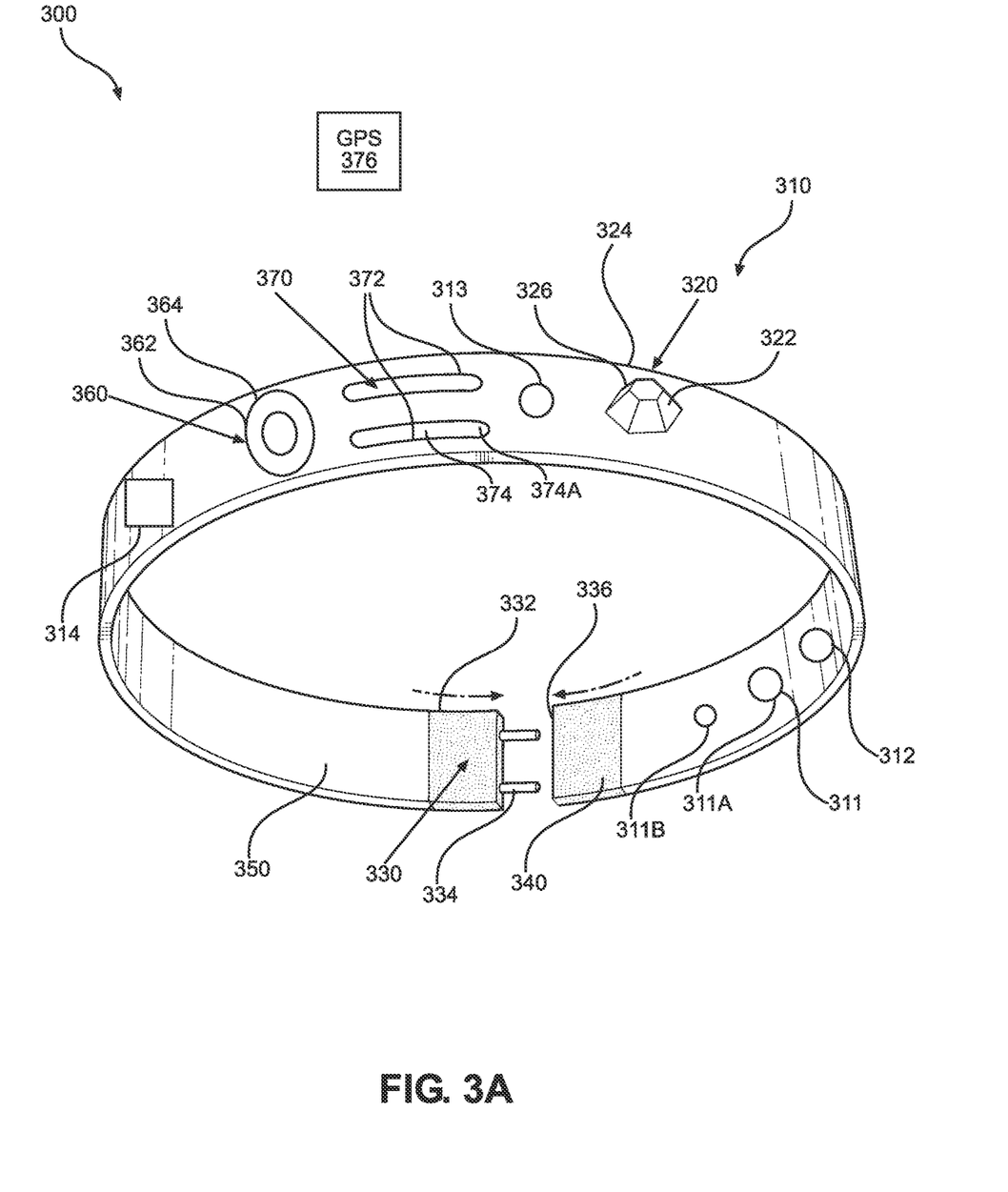
FIG. 3A shows a perspective side view of an embodiment of the wearable location tracking and monitoring device.
Figure 3B:
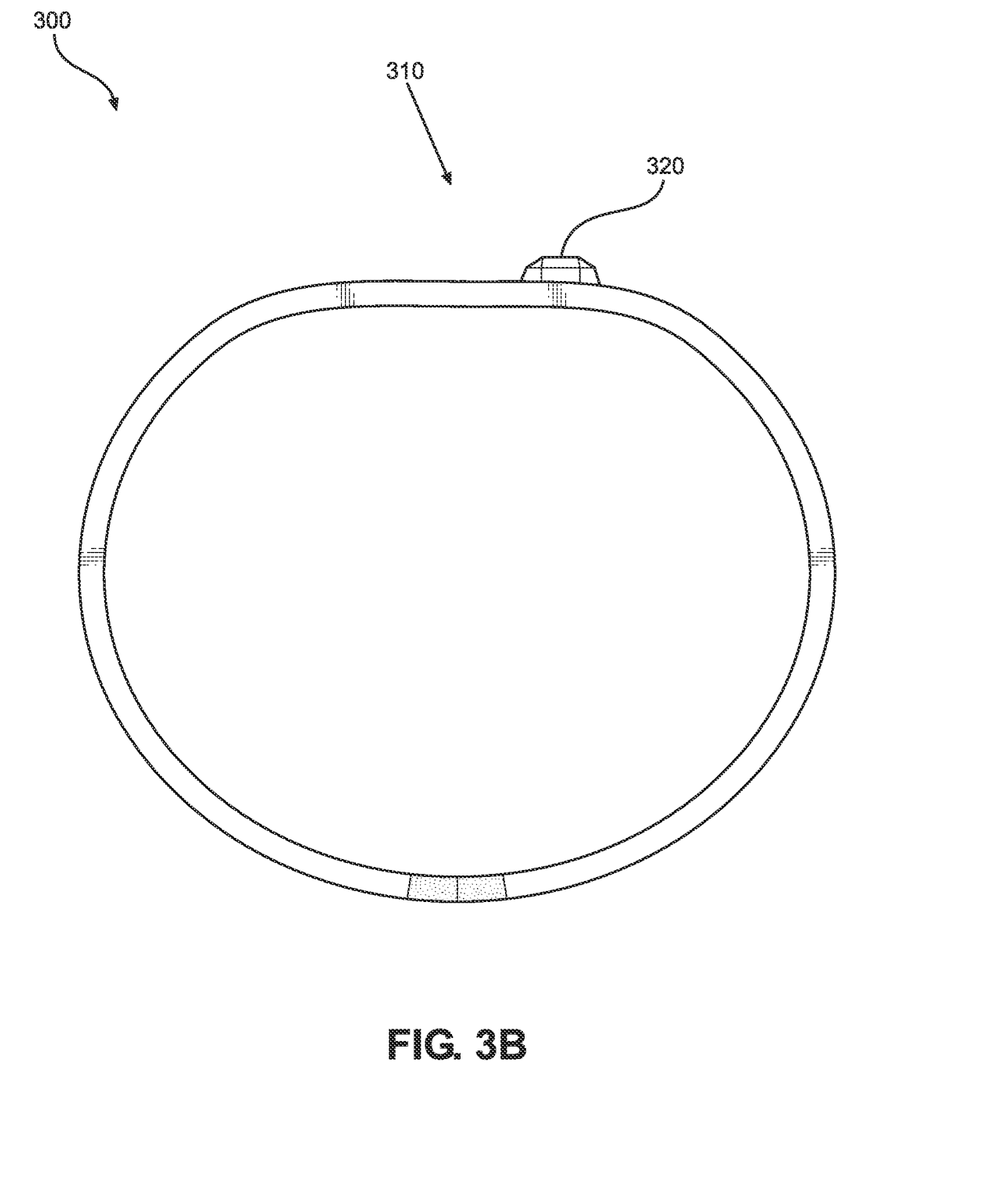
FIG. 3B shows a perspective overhead view of an embodiment of the wearable location tracking and monitoring device.
Figure 3C:
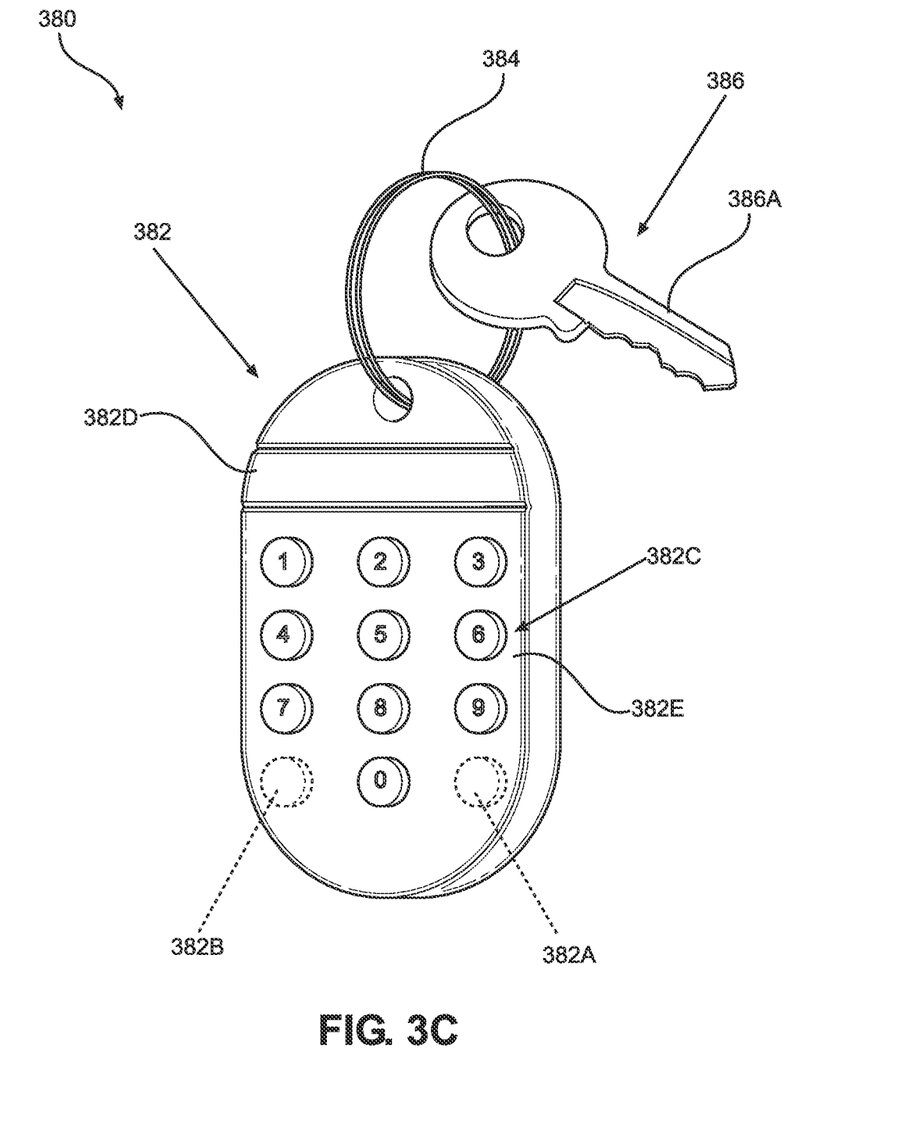
FIG. 3C shows a perspective front view of an embodiment of a remote control device for the wearable location tracking and monitoring device.

The wearable location tracking and monitoring device 300 is described in more detail in FIGS. 3A-3C.

Figure 2A:
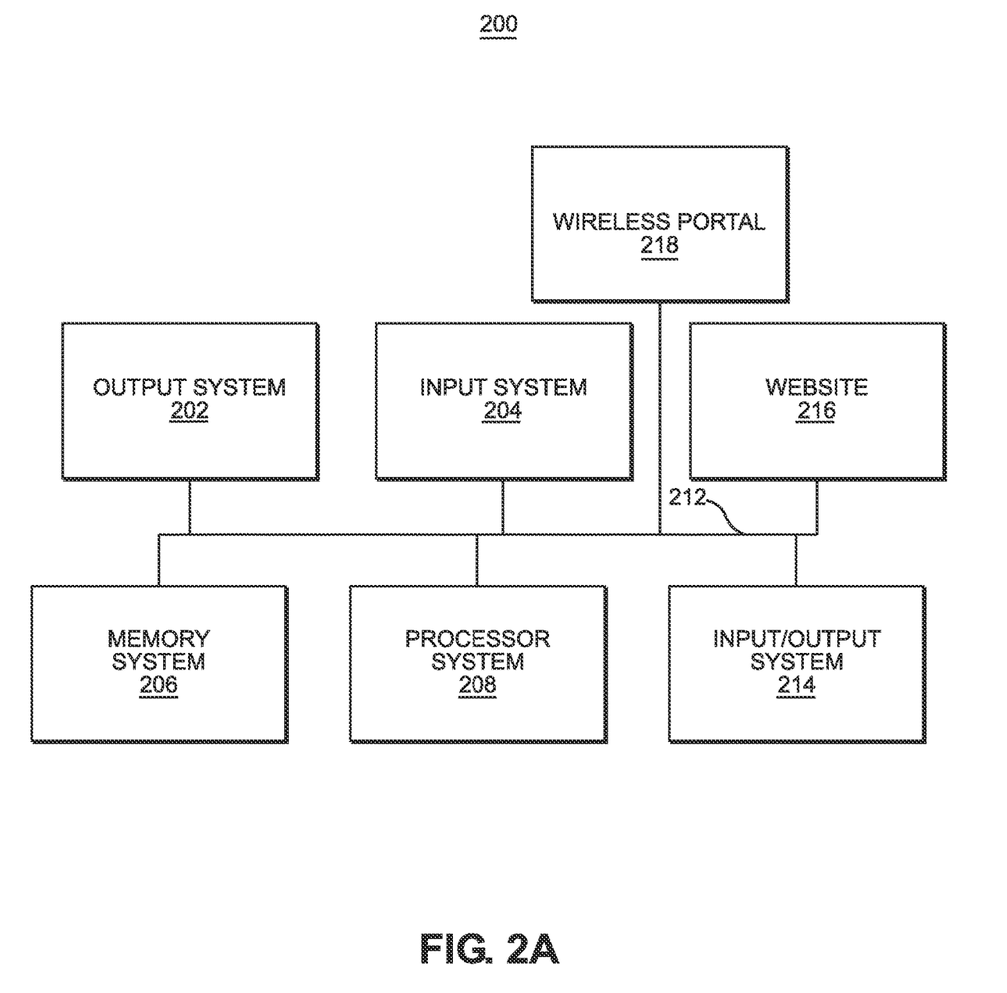
FIG. 2A shows a block diagram of a client system of the system for using a wearable location tracking and monitoring device.

Referring now to FIG. 2A, there is shown a block diagram of a client system 200 of the system for using a wearable location tracking and monitoring device 100.

The client system 200 may include an output system 202, an input system 204, a memory system 206, a processor system 208, a communications system 212, an input/output system 214, a website 216, and a wireless portal 218. Other embodiments of the client system 200 may not have all of the components and/or may have other embodiments in addition to or instead of the components listed above.

The client system 200 may be any one of the client systems 110, 114, 116, 118, 120, and/or handheld wireless device 122 that may be used as one of the network devices of FIG. 1. In other embodiments, the client system 200 may include additional components and/or may not include all of the components listed above. The output system 202 may include any one of, some of, any combination of, or all of a monitor system, a wireless transmitter, a handheld display system, a printer system, a speaker system, a connection or an interface system to a sound system, an interface system to peripheral devices and/or a connection and/or an interface system to a computer system, an intranet, and/or the Internet, for example.

The input system 204 may include any one of, some of, any combination of, or all of a keyboard system, a mouse system, a track ball system, a track pad system, one or more buttons on a handheld system, a scanner system, a wireless receiver, a microphone system, a connection to a sound system, and/or a connection and/or an interface system to a computer system, an intranet, and/or the Internet (i.e., Infrared Data Association or IrDA, Universal Serial Bus or USB), for example.

Figure 2B:
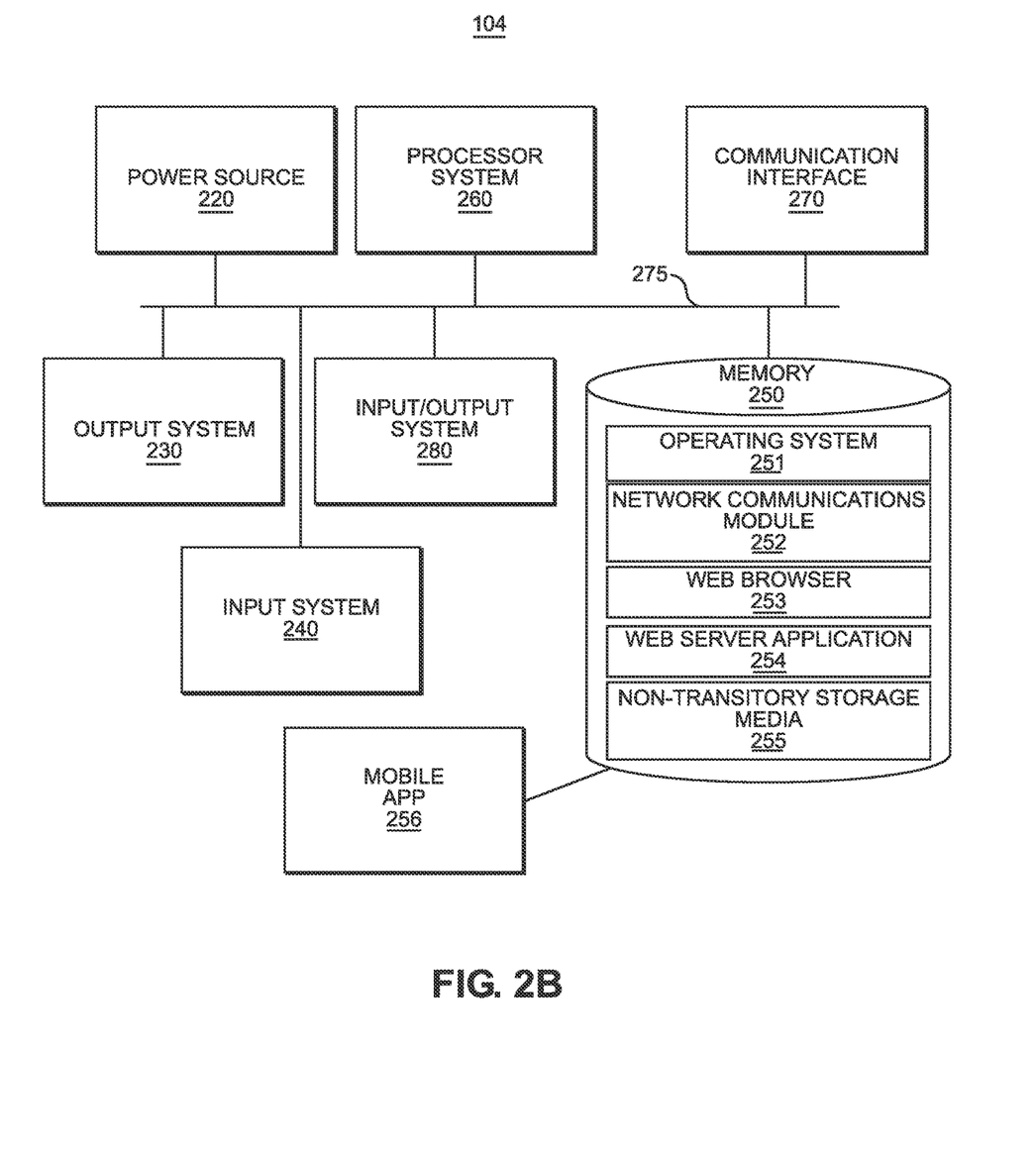
FIG. 2B shows a block diagram of a server system of the system for using a wearable location tracking and monitoring device.

The memory system 206 may include, for example, any one of, some of, any combination of or all of a long-term storage system, such as a hard drive, a short-term storage system, such as a random-access memory, a removable storage system, such as a floppy drive or a removable drive, and/or a flash memory. The memory system 206 may include one or more machine-readable mediums that may store a variety of different types of information. The term machine-readable medium is used to refer to any medium that is structurally configured for carrying information in a format that is readable by a machine. One example of a machine-readable medium is a computer-readable medium. The memory system 206 also stores a non-transitory storage media using a wearable location tracking and monitoring device (FIG. 2B, 255).

The processor system 208 may include any one of, some of, any combination of, or all of multiple parallel processors, a single processor, a system of processors having one or more central processors and/or one or more specialized processors dedicated to specific tasks. The processor system 208 may implement the programs stored in the memory system 206. The communications system 212 may communicatively button the output system 202, the input system 204, the memory system 206, the processor system 208, and/or the input/output system 214 to each other. The communications system 212 may include any one of, some of, any combination of, or all of one or more electrical cables, fiber optic cables, and/or means for sending signals through air or water (i.e., wireless communications), or the like. Some examples of means for sending signals through air and/or water include systems for transmitting electromagnetic waves such as infrared and/or radio waves and/or systems for sending sound waves.

The input/output system 214 may include devices that have the dual function as input and output devices. For example, the input/output system 214 may include one or more touch sensitive screens, which display an image and therefore are an output device and accept input when the screens are pressed by a finger or a stylus, for example. The touch sensitive screens may be sensitive to heat, capacitance and/or pressure. One or more of the input/output devices may be sensitive to a voltage or a current produced by a stylus, for example. The input/output system 214 is optional and may be used in addition to or in place of the output system 202 and/or the input device 204.

The client systems 110, 114, 116, 118, and 120 and the handheld wireless device 122 may also be tied into a website 216 or a wireless portal 218 which is also tied directly into the communications system 212. Any website 216 or wireless portal 218 would also include software and a website module (no number) to maintain, allow access to and run the website as well.

FIG. 2B shows a block diagram of a server system 104 of the system for using a wearable location tracking and monitoring device 100.

The server system 104 may include a power source 220, an output system 230, an input system 240, a memory system 250, which may store an operating system 251, a communications module 252, a web browser module 253, a web server application 254, and a non-transitory storage media for using a wearable location tracking and monitoring device 255. The server system 104 may also include a processor system 260, a communications interface 270, a communications system 275 and an input/output system 280. In other embodiments, the server system 104 may include additional components and/or may not include all of the components listed above.

The output system 230 may include any one of, some of, any combination of, or all of a monitor system, a handheld display system, a printer system, a speaker system, a connection or interface system to a sound system, an interface system to one or more peripheral devices and/or a connection and/or interface system to a computer system, an intranet, and/or the Internet, for example.

The input system 240 may include any one of, some of, any combination of, or all of a keyboard system, a mouse system, a track ball system, a track pad system, one or more buttons on a handheld system, a scanner system, a microphone system, a connection to a sound system, and/or a connection and/or an interface system to a computer system, an intranet, and/or the Internet (i.e., IrDA, USB), for example.

The memory system 250 may include, for example, any one of, some of, any combination of, or all of a long-term storage system, such as a hard drive, a short-term storage system, such as random-access memory, a removable storage system, such as a floppy drive or a removable drive and/or a flash memory. The memory system 250 may include one or more machine-readable mediums that may store a variety of different types of information. The term machine-readable medium is used to refer to any medium capable of carrying information that is readable by a machine. One example of a machine-readable medium is a computer-readable medium. The memory system 250 may store one or more machine instructions for reading, searching and enhancing a system and method for using a wearable location tracking and monitoring device 100. The operating system 251 controls all software or non-transitory storage media and hardware of the overall system 100. The communications module 252 may enable the server system 104 to communicate on the communications network 112. The web browser module 253 allows for browsing the Internet. The web server application 254 serves a plurality of web pages to client systems that request the webpages, thereby facilitating browsing on the Internet. The non-transitory storage media for using a wearable location tracking and monitoring device 255 may also include a mobile app 256 or the like. The mobile app 256 may be downloaded onto a hand-held device 122 or the like.

The processor system 260 may include any one of, some of, any combination of, or all of multiple parallel processors, a single processor, a system of processors having one or more central processors and/or one or more specialized processors dedicated to specific tasks. The processor system 260 may implement the machine instructions stored in the memory system 250.

In an alternative embodiment, the communication interface 270 allows the server system 104 to interface with the network 112. In this embodiment, the output system 230 sends communications to the communication interface 270. The communications system 275 communicatively buttons the output system 230, the input system 240, the memory system 250, the processor system 260 and/or the input/output system 280 to each other. The communications system 275 may include any one of, some of, any combination of, or all of one or more electrical cables, fiber optic cables, and/or sending signals through air or water (i.e., wireless communications), or the like. Some examples of sending signals through air and/or water include systems for transmitting electromagnetic waves such as infrared and/or radio waves and/or systems for sending sound waves.

The input/output system 280 may include devices that have the dual function as the input and output devices. For example, the input/output system 280 may include one or more touch sensitive screens, which display an image and therefore are an output device and accept input when the screens are pressed by a finger or a stylus, for example. The touch sensitive screens may be sensitive to heat and/or pressure. One or more of the input/output devices may be sensitive to a voltage or a current produced by a stylus, for example. The input/output system 280 is optional and may be used in addition to or in place of the output system 230 and/or the input device 240.

FIG. 3A shows a perspective side view of an embodiment of the wearable location tracking and monitoring device 300.

The wearable location tracking and monitoring device 300 may include a tracking bracelet 310, a video camera 320, an electronic locking closure 330, a locking closure window 340, a backup physical key lock 350, a voice activation device 360, and a Global Positioning Satellite or GPS system 370.

The tracking bracelet 310 may be hollow with a generally circular shape or the like. The tracking bracelet 310 may be made of metal or a similar sturdy material or the like to prevent it from being tampered with or damaged. The tracking bracelet 310 may also include an internal power supply 311, a control circuit 312, a wireless transceiver 313, and a clock display 314. The internal power supply 311 may be a rechargeable battery 311A which may include one or more charging ports 311B. The control circuit 312 may be disposed within the tracking bracelet 310. The wireless transceiver 313 may permit wireless communication between the tracking bracelet 310 and the remote control device (FIG. 3C, 380), which also includes a wireless transceiver 328B. The clock display 314 may be disposed on the tracking bracelet 310 in a conspicuous location for ease of viewing.

The camera 320 may include a lens element 322 that may be positioned beneath a transparent shroud element 324 that resembles a jewel 326, such that the lens element 322 is hidden from plain view. The camera 320 may be utilized by a wearer to record potentially unsafe situations where it is safer to keep knowledge of a recording happening hidden from an individual being recorded. The jewel 326 may be white, transparent, and shiny like a diamond or the like.

The electronic locking closure 330 may prevent the wearer from accidentally removing or losing the tracking bracelet 310 and may only be unlocked upon receiving a remote unlock code 332. The electronic locking closure 330 may have a pair of extensions 334 that are inserted into a corresponding pair of apertures 336 that are pushed together to lock the tracking bracelet 310.

The locking closure window 340 may be disposed over the electronic locking closure 330 to view the pair of extensions 334 that are inserted into the corresponding pair of apertures 336 that are pushed together to lock the tracking bracelet 310.

The backup physical key lock 350 may be utilized as an alternative safe way for unlocking the tracking bracelet 310 in the event the electronic locking closure 330 fails. The backup physical key lock 350 may be disposed on the tracking bracelet 310.

The voice activation device 360 may include a microphone 362 and a speaker 364 for voice activation capabilities. The voice activation device 360 may be utilized to activate the camera 320 or other functions of the tracking bracelet 310 as an additional safety feature or the like.

The GPS system 370 may include a GPS receiver 372 that may be disposed on the tracking bracelet 310 that may be configured to receive and calculate a plurality of updated geographic location information 374 via communication with a GPS satellite network 376. The updated geographic location information 374 may be displayed on a tracking bracelet display 378 as a plurality of longitude and latitude coordinates 374A in the shown embodiment. Other embodiments may include different display graphics (not shown) to display the longitude and latitude coordinates 374A. The updated geographic location information 374 may be wirelessly communicated to the tracking bracelet 310 via the GPS satellite network 376 and is also displayed on an electronic location display 337 of the tracking bracelet 310, which may also include the clock display 314 and other important information.

FIG. 3B shows a perspective overhead view of an embodiment of the wearable location tracking and monitoring device 300.

The wearable location tracking and monitoring device 300 may have a strong, sturdy, shiny metal finish or the like. If the wearable location tracking and monitoring device 300 is tampered with, it will automatically send a signal to the camera 320 or the overall system 100. The wearable location tracking and monitoring device 300 may only be opened by a parent or other caregiver.

FIG. 3C shows a perspective front view of an embodiment of a remote control device 380 for the wearable location tracking and monitoring device 300.

The remote control device 380 may be in wireless communication with the tracking bracelet 310. The remote control device 380 may control various aspects of the tracking bracelet 310. In the shown embodiment, the remote control device 380 may include a housing 382 having a key ring 384 or other fastener for securing the housing 382 to an object 386 such as a key 386A. The housing 382 may also include an internal power supply 382A, a wireless transceiver 382B, an input mechanism 382C such as a keypad 382C', and an electronic display 382D. The electronic display 382D may show the current geographic location of the wearer of the tracking bracelet 310, either as a coordinate or as a visual indicator overlaying a map display (not shown). The input mechanism 382C may be utilized to enter the remote unlock code 332 to unlock the electronic locking closure 330 of the tracking bracelet 310. In some embodiments, the input mechanism 382C may be utilized to control other aspects of the tracking bracelet 310, including a threshold safe distance before a safety alarm (not shown) is activated or the like.

Figure 4:
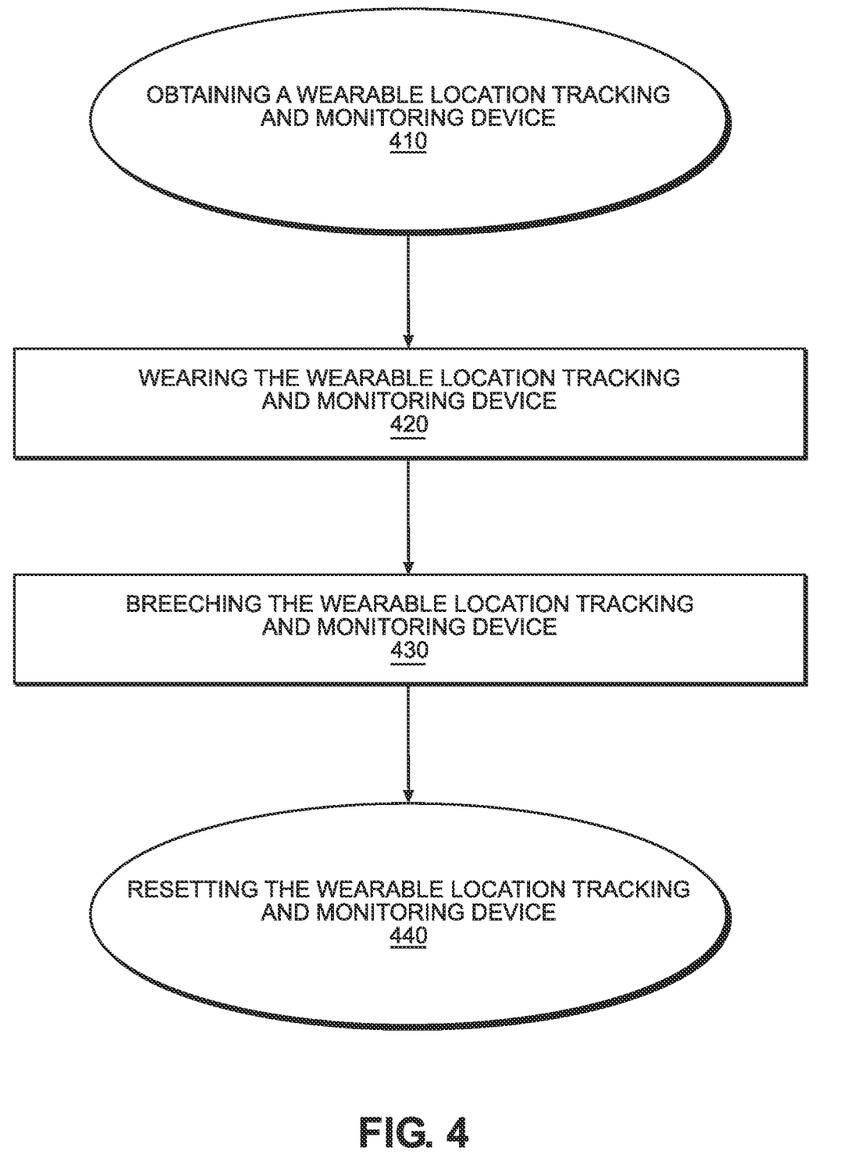
FIG. 4 shows a flowchart for a method for using a wearable location tracking and monitoring device.

FIG. 4 shows a flowchart for a method for using a wearable location tracking and monitoring device 400.

The overall method 400 may include the steps of obtaining a wearable location tracking and monitoring device 410, wearing the wearable location tracking and monitoring device 420, notifying a wearer about breeching the wearable location tracking and monitoring device 430, and resetting the wearable location tracking and monitoring device 440.

The obtaining step 410 may include purchasing the wearable location tracking and monitoring device or the like. The wearing step 420 may include opening-up the wearable location tracking and monitoring device with a code and placing it on a wrist of a wearer and closing it over the wrist of the wearer. The notifying step 430 may include automatically sending a notification to the wearer about breeching the wearable location tracking and monitoring device. The resetting step 440 may include resolving the notification to the wearer about breeching the wearable location tracking and monitoring device and activating the wearable location tracking and monitoring device.

A non-transitory computer storage media (FIG. 2B, 255) having instructions stored thereon which, when executed, executes the overall method 400.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the present invention. Furthermore, since numerous modifications and changes will readily occur to those skilled in the art, it is not desired to limit the present invention to the exact construction and operation shown and described, and accordingly, all suitable modifications and equivalents may be resorted to, falling within the scope of the present invention.

I claim:

1. A system, comprising:
   a server system with a processor system, a communications interface, a communications system, an input system and an output system, the server system having access to a communications network;
   a memory system with an operating system, a communications module, a web browser module, a web server application and a non-transitory storage media for using a wearable remote monitoring device, the memory system is in communication with the server system through the communications network; and
   a wearable location tracking and monitoring device wirelessly communicating with a remote control device;
   wherein the wearable location tracking and monitoring device is in communication with the memory system and the non-transitory storage media for using a wearable location tracking and monitoring device;
   wherein the wearable location tracking and monitoring device includes a tracking bracelet, a video camera, an electronic locking closure, a locking closure window, a backup physical key lock, a voice activation device, and a GPS system;
   wherein the tracking bracelet includes a clock display;
   wherein the internal power supply is a rechargeable battery; and
   wherein the wireless transceiver permits wireless communication between the tracking bracelet and the remote control device which also includes a wireless transceiver.

2. The system according to claim 1, wherein the tracking bracelet is made of metal to prevent tampering and damage.

3. The system according to claim 1, wherein the tracking bracelet includes an internal power supply, a control circuit, and a wireless transceiver.

4. The system according to claim 3, wherein the rechargeable battery includes one or more charging ports.

5. The system according to claim 1, wherein the video camera includes a lens element that is positioned beneath a transparent shroud element that resembles a jewel, such that the lens element is hidden from plain view.

6. The system according to claim 5, wherein the video camera is utilized by a wearer to record potentially unsafe situations where it is safer to keep knowledge of a recording happening hidden from an individual being recorded.

7. The system according to claim 1, wherein the electronic locking closure has a pair of extensions that are inserted into a corresponding pair of apertures that are pushed together to lock the tracking bracelet.

8. The system according to claim 7, wherein the locking closure window is disposed over the electronic locking closure to view the pair of extensions that are inserted into the corresponding pair of apertures that are pushed together to lock the tracking bracelet.

9. The system according to claim 1, wherein the backup physical key lock is disposed on the tracking bracelet and is utilized as an alternative safe way for unlocking the tracking bracelet if the electronic locking closure fails.

10. The system according to claim 1, wherein the voice activation device includes a microphone and a speaker for voice activation capabilities that is utilized to activate the video camera of the tracking bracelet as an additional safety feature.

11. The system according to claim 1, wherein the GPS system includes a GPS receiver that is disposed on the tracking bracelet that receives and calculates a plurality of updated geographic location information via communication with a GPS satellite network.

12. The system according to claim 11, wherein the updated geographic location information is displayed on a tracking bracelet display as a plurality of longitude and latitude coordinates.

13. The system according to claim 11, wherein the updated geographic location information is wirelessly communicated to the tracking bracelet via the GPS satellite network and is displayed on an electronic location display of the tracking bracelet.

14. The system according to claim 11, wherein the wearable remote monitoring device will automatically send an electronic communication to the video camera if tampered with.

15. The system according to claim 1, wherein the remote control device includes a housing having a key ring, an internal power supply, a wireless transceiver, an input mechanism, and an electronic display.

16. The system according to claim 15, wherein the electronic display shows the updated geographic location information of the wearer of the tracking bracelet.

17. A method for using a wearable location tracking and monitoring device, comprising the steps of:
   obtaining a wearable location tracking and monitoring device;
   wearing the wearable location tracking and monitoring device;
   notifying a wearer about breeching the wearable location tracking and monitoring device; and
   resetting the wearable location tracking and monitoring device;
   wherein the wearable location tracking and monitoring device includes a tracking bracelet, a video camera, an electronic locking closure, a locking closure window, a backup physical key lock, a voice activation device, and a GPS system.

18. A non-transitory computer storage media having instructions stored thereon which, when executed, execute a method comprising the steps of:
   obtaining a wearable location tracking and monitoring device;
   wearing the wearable location tracking and monitoring device;
   notifying a wearer about breeching the wearable location tracking and monitoring device; and
   resetting the wearable location tracking and monitoring device;
   wherein the wearable location tracking and monitoring device includes a tracking bracelet, a video camera, an electronic locking closure, a locking closure window, a backup physical key lock, a voice activation device, and a GPS system.

* * * * *